Patented Feb. 23, 1926.

1,573,982

UNITED STATES PATENT OFFICE.

JOHN MACADAM AND WILLIAM BERRY, OF WILMINGTON, DELAWARE.

TEXTILE BELT.

No Drawing.   Application filed August 11, 1922. Serial No. 581,240.

*To all whom it may concern:*

Be it known that we, JOHN MACADAM and WILLIAM BERRY, citizens of the United States, and residents of Wilmington, in the county of New Castle and State of Delaware, both citizens of the United States, have invented a certain new and useful Improvement in Textile Belts, of which the following is a true and exact description.

Our invention relates to textile material, generally in the form of belts, especially prepared and adapted for such uses as transmission clutch linings, brake linings and as belting for the transmission of power. Textile material as prepared for such uses is much thicker than material prepared for use in the manufacture of clothing or artificial leather and is softened so as to have great tensile strength and so also as to form a pad with a high power of resistance to frictional wear. The object of our invention is to provide such textile material with a wearing surface which will give it greater durability under conditions of use and maintain a more even friction with metal surfaces in contact with it, and our invention consists in impregnating and coating the wearing surface of such textile material or belting as is commonly made and used for such purposes with cellulose, preferably mixed with and incorporating finely divided particles of matter and preferably of graphite. A belt so coated with cellulose will, we have found, not only last longer than an uncoated belt but will offer a more even frictional contact with a metal surface, and in both respects the good qualities of the belting are increased by the incorporation in the cellulose coating of a suitable finely divided solid such as graphite.

We have prepared our new belting by applying to the surface or surfaces of ordinary commercial belting a layer of viscose, preferably having graphite mixed with it, subjecting the belting so coated to pressure between rolls to insure that the viscose shall be thoroughly incorporated with the portions of the yarn making up the surface of the belt and then converting the viscose into cellulose by any of the well known treatments used for this purpose.

Having now described our invention, what we claim as new and desire to secure by Letters Patent is:

1. A textile material suitable for transmission clutch lining, belting and the like, having its surface impregnated and coated with cellulose and with solid particles of finely divided graphite mixed with and embedded in the cellulose coating.

2. A transmission clutch lining having the characteristic structural qualities of cotton belting and having its friction surface impregnated with cellulose.

JOHN MACADAM.
WILLIAM BERRY.